US011268205B2

(12) United States Patent
Lee et al.

(10) Patent No.: US 11,268,205 B2
(45) Date of Patent: Mar. 8, 2022

(54) ELECTROPLATING REPAIR MACHINE FOR TACK EXPANSION AND SEAL WELDING REGION, ELECTROPLATING REPAIR SYSTEM, AND OPERATING METHOD

(71) Applicant: Doosan Heavy Industries & Construction Co., LTD., Changwon-si (KR)

(72) Inventors: Seon Ho Lee, Changwon-si (KR); Min Gi Choi, Changwon-si (KR); Sang Cheol Lee, Changwon-si (KR)

(73) Assignee: Doosan Heavy Industries & Construction Co. LTD, Changwon-Si (KR)

( * ) Notice: Subject to any disclaimer, the term of this patent is extended or adjusted under 35 U.S.C. 154(b) by 15 days.

(21) Appl. No.: 16/167,493

(22) Filed: Oct. 22, 2018

(65) Prior Publication Data

US 2019/0128467 A1    May 2, 2019

(30) Foreign Application Priority Data

Nov. 1, 2017 (KR) .......................... 10-2017-0144838

(51) Int. Cl.
    *C25D 7/04*         (2006.01)
    *F16L 55/18*        (2006.01)
    (Continued)

(52) U.S. Cl.
    CPC .................. *C25D 7/04* (2013.01); *B23P 6/00* (2013.01); *B23P 6/04* (2013.01); *C25D 5/02* (2013.01);
    (Continued)

(58) Field of Classification Search
    CPC ..... F16L 55/18; B23P 6/00; B23P 6/04; F22B 37/107; F22B 37/246; C25D 7/04;
    (Continued)

(56) References Cited

U.S. PATENT DOCUMENTS 4,437,943 A * 3/1984 Beck ................... H01L 21/4825
                                                    204/224 R
4,826,582 A * 5/1989 Lavalerie ................ F28G 13/00
                                                    204/196.01
(Continued)

FOREIGN PATENT DOCUMENTS

CN          1044729 C       8/1999
CN        202519354 U      11/2012
(Continued)

OTHER PUBLICATIONS

First Office action (english translation.
First Office Action (Chinese).

*Primary Examiner* — Louis J Rufo

(74) *Attorney, Agent, or Firm* — Foundation Law Group LLP; Kwang Jun Kim; J D Harriman

(57) ABSTRACT

Disclosed are an electroplating repair apparatus, an electroplating repair system having the same, and an operating system thereof. The apparatus includes a probe body extending a predefined length in a structure corresponding to an inner diameter part of a tube, an electroplating electrode attached to and surrounding an outer circumferential surface of the probe body, a sealing member attached to opposite end sides of the probe body to seal a target portion to be electroplated, and a solution supply line supplying a solution to the target portion through the inside of the probe body, wherein the apparatus has a structure capable of wholly repairing the inside of the tube including a sealing welding part and an expanded part.

7 Claims, 10 Drawing Sheets

(51) Int. Cl.
  *B23P 6/04*    (2006.01)
  *C25D 5/02*    (2006.01)
  *F22B 37/24*   (2006.01)
  *F22B 37/10*   (2006.01)
  *B23P 6/00*    (2006.01)
  *C25D 5/00*    (2006.01)
  *C25D 5/08*    (2006.01)

(52) U.S. Cl.
  CPC ............... *C25D 5/08* (2013.01); *C25D 5/67* (2020.08); *F16L 55/18* (2013.01); *F22B 37/107* (2013.01); *F22B 37/246* (2013.01)

(58) Field of Classification Search
  CPC ... C25D 5/02; C25D 5/06; C25D 5/08; C25D 21/12; C25D 17/14
  See application file for complete search history.

(56) References Cited

U.S. PATENT DOCUMENTS

| | | | | |
|---|---|---|---|---|
| 4,849,084 A | * | 7/1989 | Vouzellaud | C25D 7/04 204/224 R |
| 5,265,667 A | * | 11/1993 | Lester, II | F22B 37/005 165/11.2 |
| 5,695,621 A | * | 12/1997 | Pop | C25D 5/20 204/280 |
| 2015/0191844 A1 | * | 7/2015 | Hunter | C25D 17/004 205/98 |

FOREIGN PATENT DOCUMENTS

| | | |
|---|---|---|
| CN | 102402749 A | 11/2013 |
| CN | 103402749 A | 11/2013 |
| CN | 106894065 A | 6/2017 |
| JP | 2000192286 A | 7/2000 |
| JP | 2010227969 A | 10/2010 |
| JP | 5278098 B | 9/2013 |
| KR | 10-0230196 B | 11/1999 |
| KR | 10-0843952 | 7/2008 |
| KR | 10-0843952 B | 7/2008 |
| KR | 10-2013-0069477 | 6/2013 |
| KR | 20-0475744 | 12/2014 |
| KR | 20-0475755 | 12/2014 |
| WO | 2017006377 A | 1/2017 |

* cited by examiner

Detail "A"

ELECTROPLATING REPAIR MACHINE FOR TACK EXPANSION AND SEAL WELDING REGION, ELECTROPLATING REPAIR SYSTEM, AND OPERATING METHOD

CROSS REFERENCE TO RELATED APPLICATION

The present application claims priority to Korean Patent Application No. 10-2017-0144838, filed Nov. 1, 2017, the entire contents of which is incorporated herein for all purposes by this reference.

BACKGROUND

1. Field

The present system relates to an electroplating repair apparatus for tack expansion and seal welding regions and, more particularly, to an electroplating repair apparatus, which is inserted a specified distance into an expanded tube so as to repair a defect of tack expansion and seal welding regions with electroplating, an electroplating repair system having the same, and an operating method thereof.

2. Description of the Background Art

Generally, a steam generator is a representative heat exchanger which is composed of two tube sheets and a plurality of heat transfer tubes, which are surrounded and sealed by a cylindrical shell.

FIG. 1 is a side sectional view of a steam generator, FIG. 2 is aside sectional view of tack expansion regions of tubes with respect to tube sheets, and FIG. 3 is an enlarged sectional view of the tack expansion and seal welding regions processed with electroplating.

Referring to FIG. 1, a hot boric acid solution is circulated through a tube side (or a primary side), along with radiation, refined water is introduced into and discharged out of a shell side (or a secondary side) in a steam state, being heat exchanged therebetween about the tubes. A U-type tube is sealed and welded to opposite tube sheets 12 without addition of a welding rod, thereby preventing an outflow of contaminated cooling water towards the secondary side.

As illustrated in FIGS. 1 and 2, the tube sheet 12 is perforated to have a plurality of holes, and the U-type tube is attached to the tube sheet. To attach the tube 11 to the tube sheet 12, the tube 11 is temporarily expanded a specified length into the hole of the tube sheet 12 and is sealing-welded thereto, followed by whole length expansion. After being inserted into the tube sheet 12, the tube is expanded a specified length such that the tube 11 is positioned in the center inside 14 of the tube sheet, and welding is performed from the tube side to form a tube side weld 12 between the tube 11 and the tube sheet 12, thereby firmly coupling the tube 11 and the tube sheet 12. Here, the tube side welding means sealing welding onto an outer portion (i.e. a portion interfacing with fluid flowing through the tube) of the coupled tube and tube sheet to prevent an outflow of fluid from the tube towards the shell side. While as a whole length expansion of a tube into a tube sheet, an explosion expansion method is conventionally preferred, a hydraulic expansion method is recently used to expand the tube 11 into the tube sheet so as to closely attach the tube to the tube sheet.

Although the tube 11 of the steam generator is a boundary between the primary aide and the secondary side, it has a thin thickness of about 1 mm for heat exchange. Conventionally, most of detects caused in the tube sheet 12 are due to stress corrosion cracks in an upper expanded transition. After the tube 11 is formed from Alloy690 resistant to stress corrosion cracking, wear or abrasion defects caused due to foreign substances introduced into the primary and secondary sides is generated, instead of due to stress corrosion cracking. Further, since in an initially manufactured WEC-type steam generator, tack expansion is performed using a roll expansion manner, many stress corrosion cracks occur in the expanded part, causing a serious problem in power plants.

To solve these problems, as illustrated in FIG. 3, defective expansion and sealing weld may be processed with electroplating (to form an electroplated part 15) to repair and seal the defective part.

According to the related art, there are cases of applying an electroplating method to repair an upper portion of the tube sheet 12, and recently, a repair technique using combined mechanical expansion and welding has been developed. However, these techniques have a problem of very low operating efficiency, since repairing sections are limited, or only a single hole can be repaired each time.

Thus, it is required to provide a repairing technique to solve the above-mentioned problems with the related art.

SUMMARY

In an aspect of the system, an electroplating repair apparatus is provided, which is inserted a predefined distance into an expanded tube to repair an expanded part and a sealing welding part through electroplating, the apparatus including: a probe body extending a predefined length in a structure corresponding to an inner diameter part of a tube; an electroplating electrode attached to and surrounding an outer circumferential surface of the probe body; a sealing member attached to opposite end sides of the probe body to seal a target portion to be electroplated; and a solution supply line supplying a solution to the target portion through the inside of the probe body.

The probe body may have: a cylindrical support; and an extension extending a predefined distance towards an inner diameter direction of the tube from the support.

A sealing member may be attached to an end of the extension such that the sealing member contacts and seals the inner diameter part of the tube.

The sealing member may have a structure of expanding with external compressed air and surface-contacting and sealing an inner surface of the tube.

An additional sealing member may be attached to one side of the cylindrical support to contact and seal a surface of a tube sheet.

The additional sealing member may be an O-ring surrounding the sealing welding part.

The electroplating electrode may have a structure in which the outer circumferential surface of the tube including titanium is coated with platinum.

The apparatus may further include a probe body holder arranging and holding the plurality of probe bodies corresponding to an arrangement of the plurality of tubes to be repaired.

In an embodiment of the system, an electroplating repair apparatus is provided, which is inserted a predefined distance into an expanded tube to repair an expanded part and a sealing welding part through electroplating, the apparatus including: a probe body extending a predefined length in a structure corresponding to an inner diameter part of a tube; a probe body holder arranging and holding the plurality of probe bodies corresponding to an arrangement of the plurality of tubes to be repaired; an electroplating electrode attached to and surrounding an outer circumferential surface of the probe body; a sealing member attached to opposite end sides of the probe body to seal a target portion to be electroplated; and a solution supply line supplying a solution to the target portion through the inside of the probe body.

The probe body may have: a cylindrical support; and an extension extending a predefined distance towards an inner diameter direction of the tube from the support.

A sealing member may be attached to an end of the extension such that the sealing member contacts and seals the inner diameter part of the tube, wherein the sealing member may have a structure of expanding with external compressed air and surface-contacting and sealing an inner surface of the tube.

In another aspect of the system, an electroplating repair system is provided, which is inserted a predefined distance into an expanded tube to repair an expanded part and a sealing welding part through electroplating, the system including:

an electroplating repair apparatus having a probe body extending a predefined length in a structure corresponding to an inner diameter part of a tube, an electroplating electrode attached to and surrounding an outer circumferential surface of the probe body, a sealing member attached to opposite end sides of the probe body to seal a target portion to be electroplated, and a solution supply line supplying a solution to the target portion through the inside of the probe body;

a manipulator having an extension arm extending a predefined length to change a position of the electroplating repair apparatus while holding the electroplating repair apparatus on one end side thereof, the extension arm being driven by the manipulator;

a manipulator control unit controlling an operation of the manipulator, wherein the extension arm is driven with a control signal from the manipulator control unit;

an electroplating control unit controlling operations of the electroplating electrode and the solution supply line of the electroplating repair apparatus; and a central control unit controlling operations of the electroplating control unit and the manipulator control unit.

The manipulator may include a main body adjacent to the tube in the inside of a target object, wherein the main body has a structure that is length-adjustable by a predefined length in the longitudinal direction corresponding to an extension direction of the tube.

The main body may have a structure corresponding to one end side of the tube and may include a coupling fitting fixedly attached to that end side of the tube.

The extension arm may have a structure surrounding an outer circumferential surface of the main body such that the extension arm is rotatable along the outer circumferential surface of the main body.

The extension arm has one or more tilting part to change a tilting angle of the extension an so as to change a position of the electroplating repair apparatus attached to one end side of the extension arm.

The electroplating control unit may include: a solution supply part supplying a solution to the electroplating repair apparatus using a pump; a solution recovery part recovering the solution supplied to the electroplating repair apparatus; a compressed air supply part supplying compressed air to the electroplating repair apparatus; and a power supply part supplying electric power to the electroplating repair apparatus.

The electroplating control unit may further include a temperature sensor to detect temperature of the solution supplied to the electroplating repair apparatus and transmit detected temperature data to the central control unit.

In a further aspect of the system, a method of operating an electroplating repair system is provided, wherein the system comprises: an electroplating repair apparatus having a probe body extending a predefined length in a structure corresponding to an inner diameter part of a tube, an electroplating electrode attached to and surrounding an outer circumferential surface of the probe body, a sealing member attached to opposite end sides of the probe body to seal a target portion to be electroplated, and a solution supply line supplying a solution to the target portion through the inside of the probe body; a manipulator having an extension arm extending a predefined length to change a position of the electroplating repair apparatus while holding the electroplating repair apparatus on one end side thereof, the extension arm being driven by the manipulator; a manipulator control unit controlling an operation of the manipulator, wherein the extension arm is driven with a control signal from the manipulator control unit; an electroplating control unit controlling operations of the electroplating electrode and the solution supply line of the electroplating repair apparatus; and a central control unit controlling operations of the electroplating control unit and the manipulator control unit, the method including:

(a) loading the probe body by a predefined distance into a target tube to be electroplated;

(b) supplying compressed air to the sealing member of the electroplating repair apparatus so as to hold the probe body to the target tube to be electroplated;

(c) supply an electroplating solution to the inside of the probe body through the solution supply line of the electroplating repair apparatus; and (d) supplying power to the electroplating electrode of the electroplating repair apparatus so as to perform an electroplating process on an expanded part and a sealing welding part.

The method-may further include (e) positioning the electroplating repair apparatus using the manipulator and the extension arm holding the electroplating repair apparatus attached to one side of the extension arm.

The positioning step may control the driving of the manipulator and the extension arm based on position data stored in the central control unit.

DETAILED DESCRIPTION

Hereinafter, embodiments of the system will be described in detail with reference to the accompanying drawings, it should be noted that terms used in this specification and claims should not be limited to a common meaning or a dictionary definition, but should be construed as the meanings and concepts according to technical spirits of the system.

It will be understood that when an element is referred to as being "on" another element, it can be directly on the other element or intervening elements may be present therebetween. Further, it will be understood that the term "comprising" or "including" specifies the presence of stated elements, but does not preclude the presence or addition of one or more other elements, unless the context clearly indicates otherwise.

Figure 1:
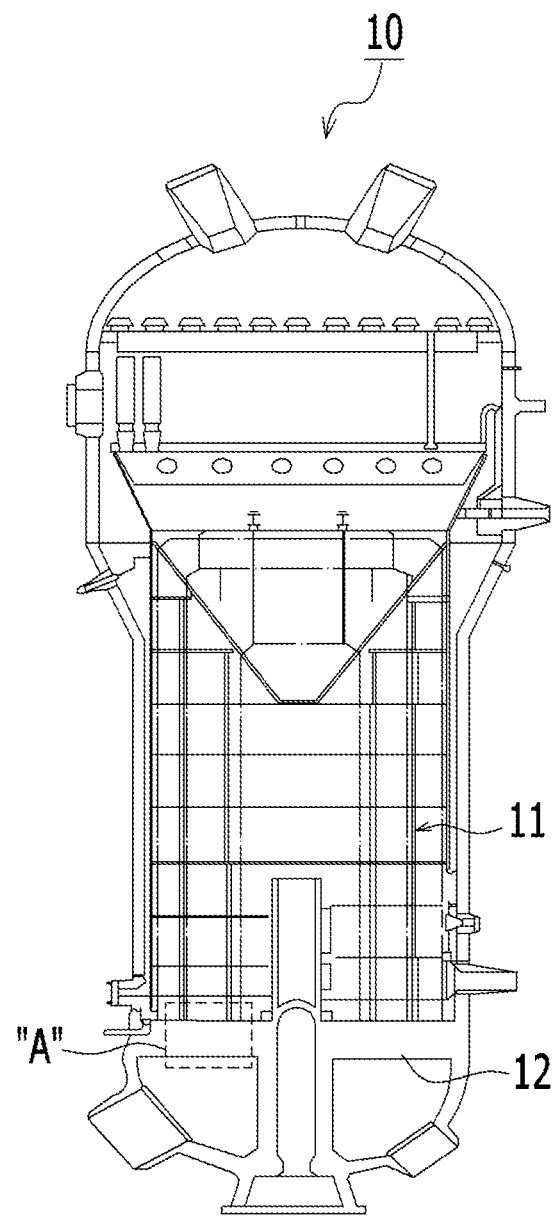
FIG. 1 is a side sectional view of a steam generator including a connection between a tube and a tube sheet.
Figure 2:
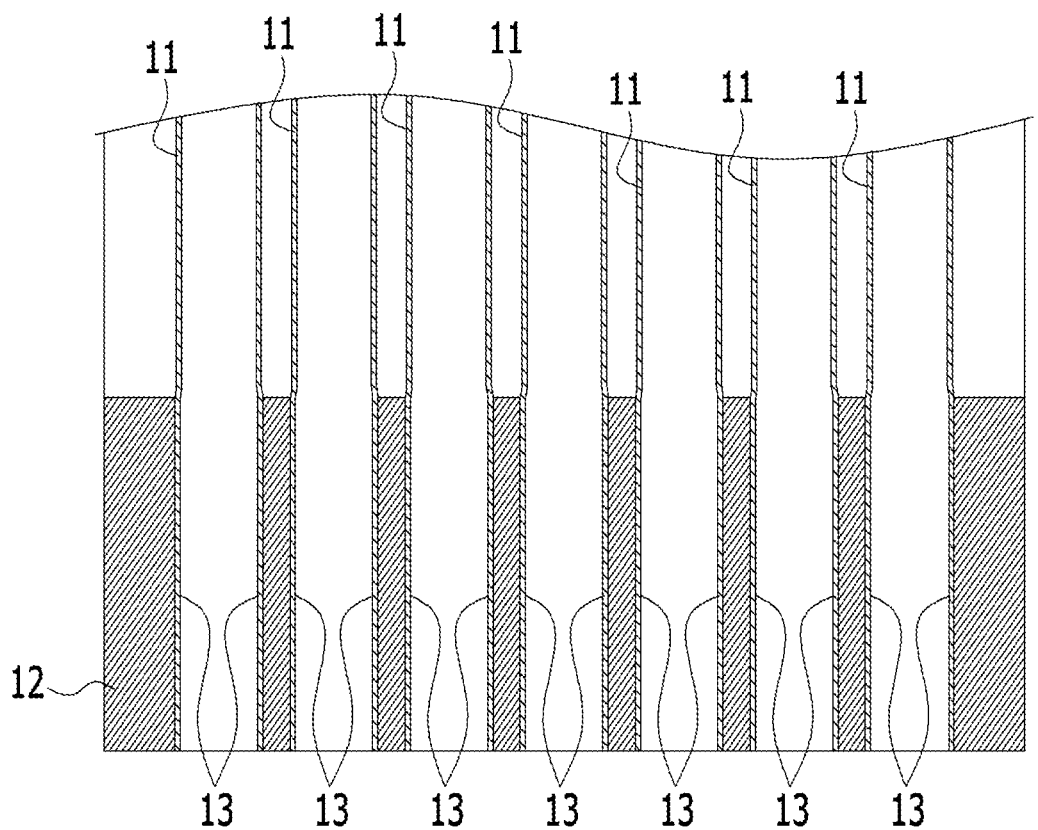
FIG. 2 is a side sectional view of a tack expansion of the connection between the tube and the tube sheet shown in FIG. 1.
Figure 3:
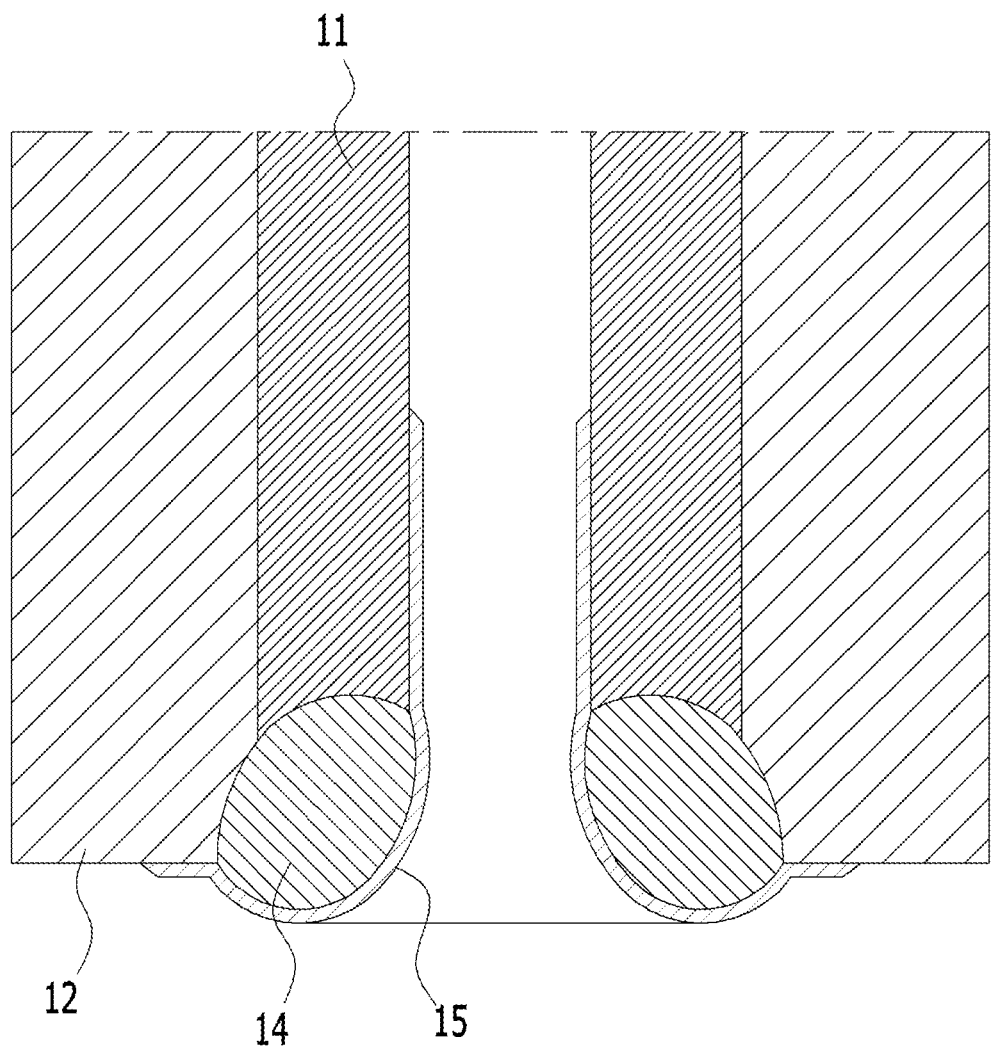
FIG. 3 is an enlarged sectional view of the tack expansion and a sealing weld processed with electroplating.
Figure 4:
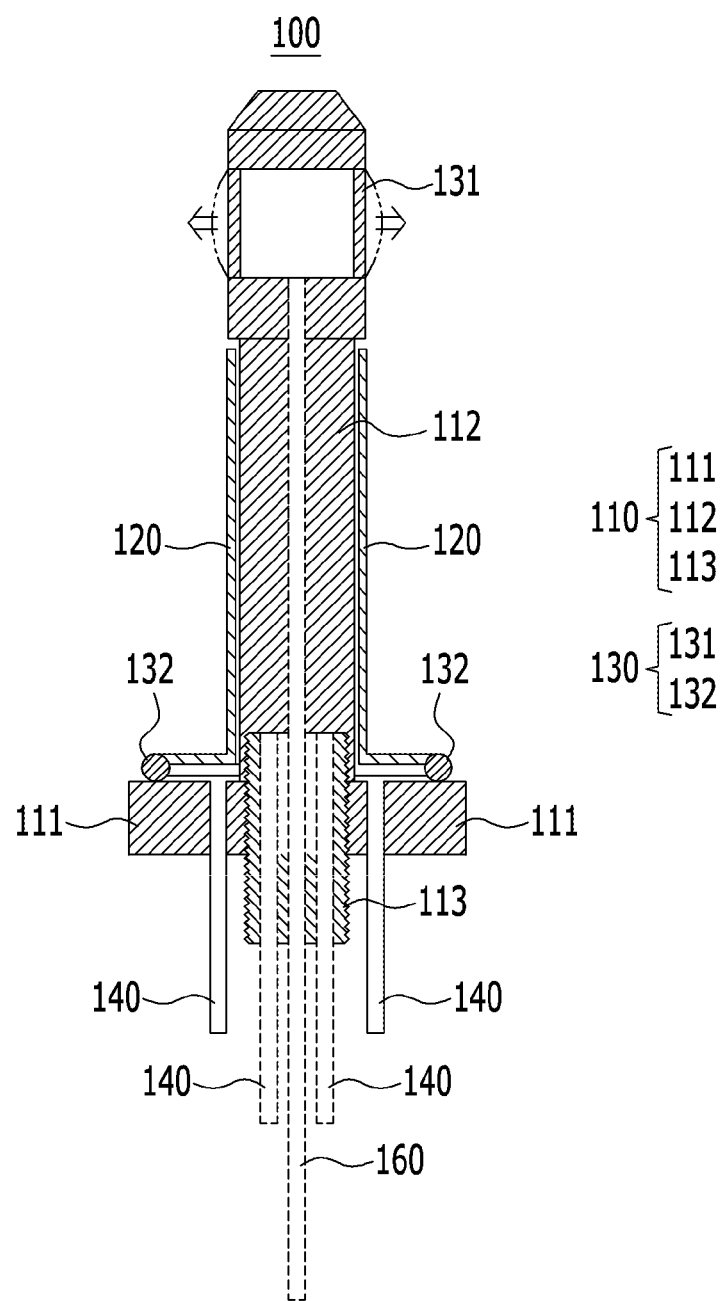
FIG. 4 is a sectional view of electroplating repair apparatus according to an embodiment of the system.
Figure 5:
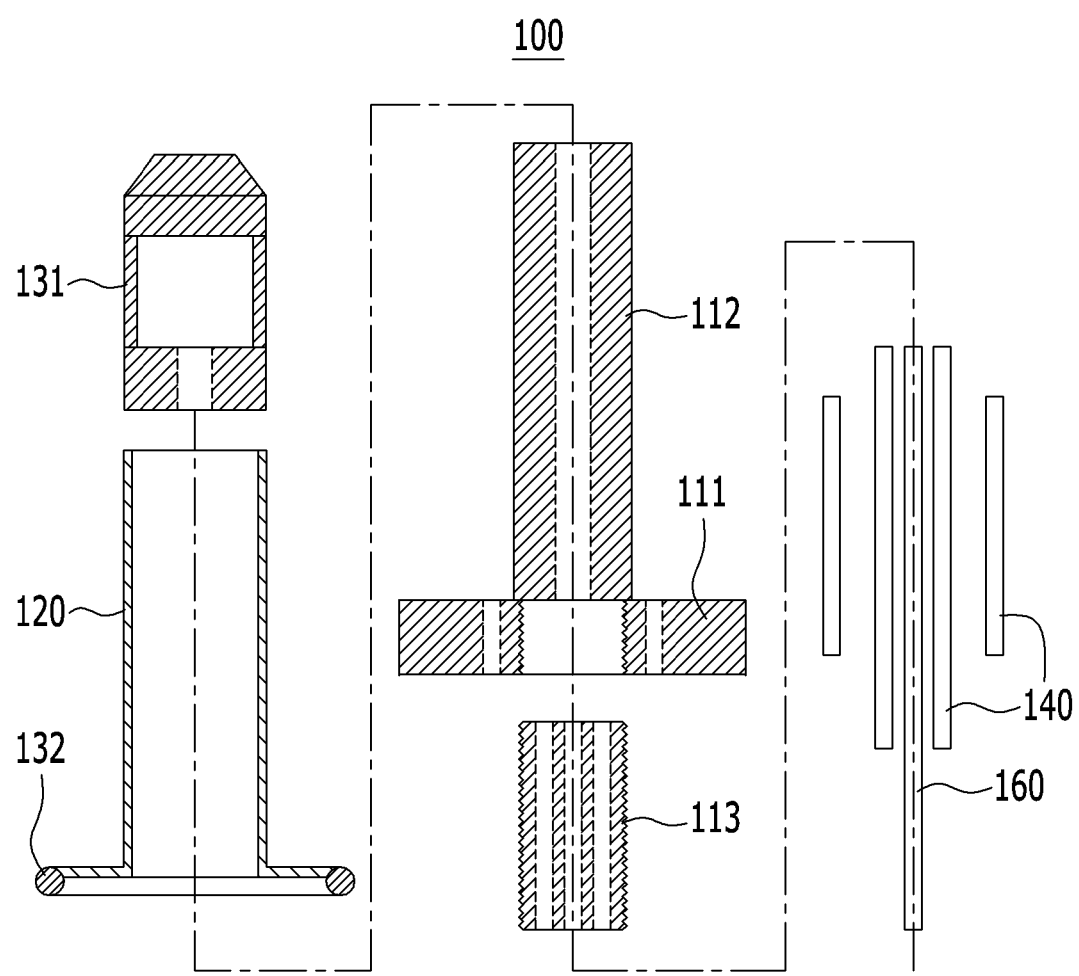
FIG. 5 is an exploded view of the electroplating repair apparatus shore in FIG. 4.
Figure 6:
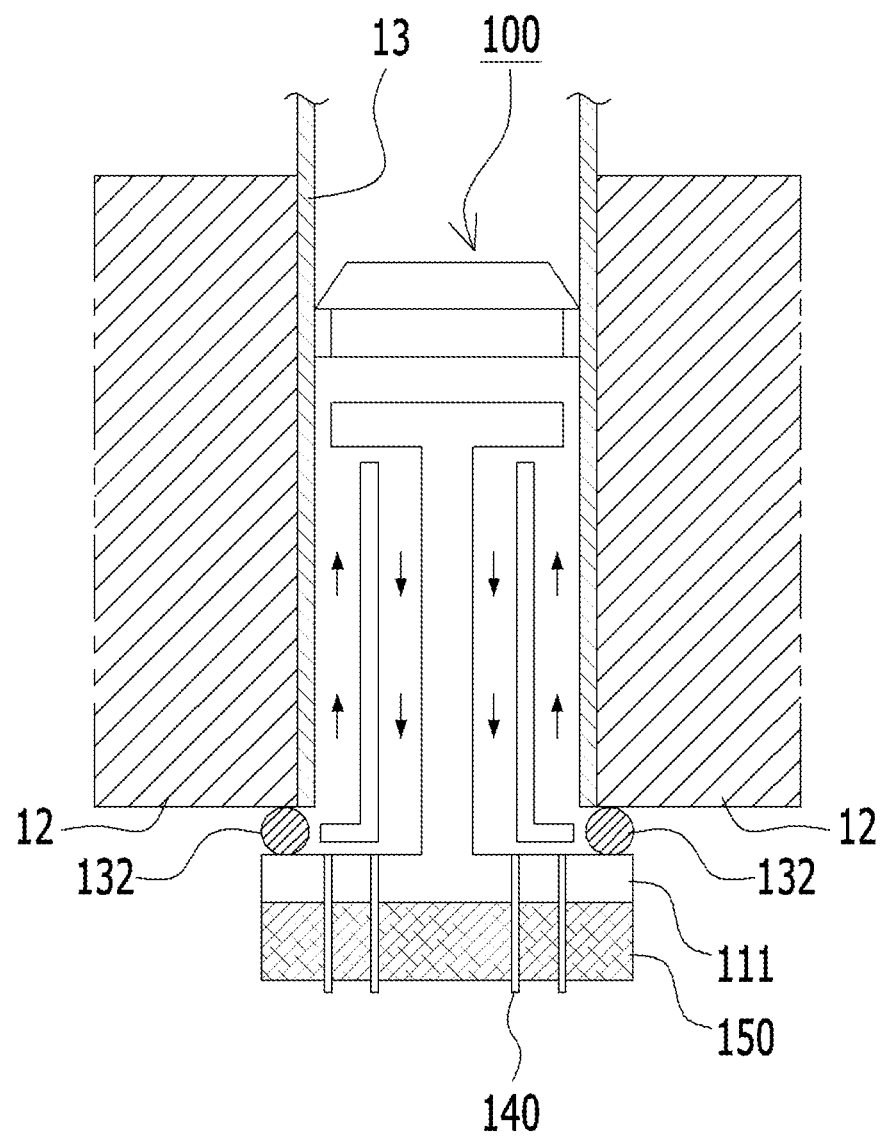
FIG. 6 is a side sectional view of illustrating the state in which the electroplating repair apparatus shown in FIG. 4 is inserted a specified distance into the tube.

FIG. 4 is a sectional view of an electroplating repair apparatus according to an embodiment of the system, FIG. 5 is an exploded view of the electroplating repair apparatus shown in FIG. 4, and FIG. 6 is a side sectional view of illustrating the state in which the electroplating repair apparatus shown in FIG. 4 is inserted a specified distance into the tube.

Referring to these drawings, the electroplating repair apparatus 100 is a repair apparatus which is inserted into an expanded tube by a specified distance so as to repair an expanded part and a sealing welding part with electroplating. The apparatus may include a probe body 110 having a specific structure, an electroplating electrode 120, a sealing member 130, and a solution supply line 140.

According to the system, the probe body 110, the electroplating electrode 120, the sealing member 130, and the solution supply line 140 of the electroplating repair apparatus enable the inside of a tube including the sealing welding part and the expanded part to be repaired wholly.

Respective elements of the electroplating repair apparatus 100 will be hereinafter described in detail with reference to the drawings.

The probe body 110 may be a structure having a diameter corresponding to the inner diameter of the tube and being formed by extending a predetermined length.

Specifically, as shown in FIGS. 4 and 5, the probe body 110 may be configured to have a structure including a support portion 11 of a disk-like structure and an extension 112. In one embodiment the extension 112 has a structure extending from the support portion 111 by a predetermined length, into the direction of the inner diameter of the tube.

The probe body 110 may have a cylindrical coupling fitting 113 attached to a lower side thereof. Here, a solution supply line 140 and a compressed air supply line 160 are closely fitted into the coupling fitting 113 so as to prevent inadvertent leakage of a solution and compressed air to be supplied.

Here, a sealing member 131 may be attached to an end of an extension 112 of the probe body so that it contacts and seals an inner surface of the tube.

Specifically, as illustrated in FIG. 4, the sealing member 131 may have a structure in which when receiving compressed air, the sealing member expands and surface-contacts the inner surface of the tube to provide a sealing effect. Here, the compressed air is supplied to the sealing member 131 from the compressed air supply line 160 through the inside of the probe body 110, as illustrated in FIG. 4.

As illustrated in FIGS. 4 to 6, another sealing member 132 may be attached to one side of a disk-shaped support 111 such that it contacts a surface of a tube sheet to provide a sealing effect. Specifically, the sealing member 132 may be an O-ring which surrounds a sealing welding part.

In the meantime, the electroplating electrode 120 may be attached to the probe body 110 such that it surrounds an outer circumferential surface of the probe body.

In one embodiment, the electroplating electrode 120 may a tube formed of titanium, wherein an outer circumferential surface of the tube is coated with platinum.

If needed, the electroplating electrode may be formed from other materials according to kinds of coating materials to be electroplated.

The sealing member 130 may be attached to opposite sides of the probe body 110 so as to seal a target portion to be electroplated.

The solution supply line 140 may supply an electroplating solution to a target portion to be electroplated through the inside of the probe body 110.

Figure 7:
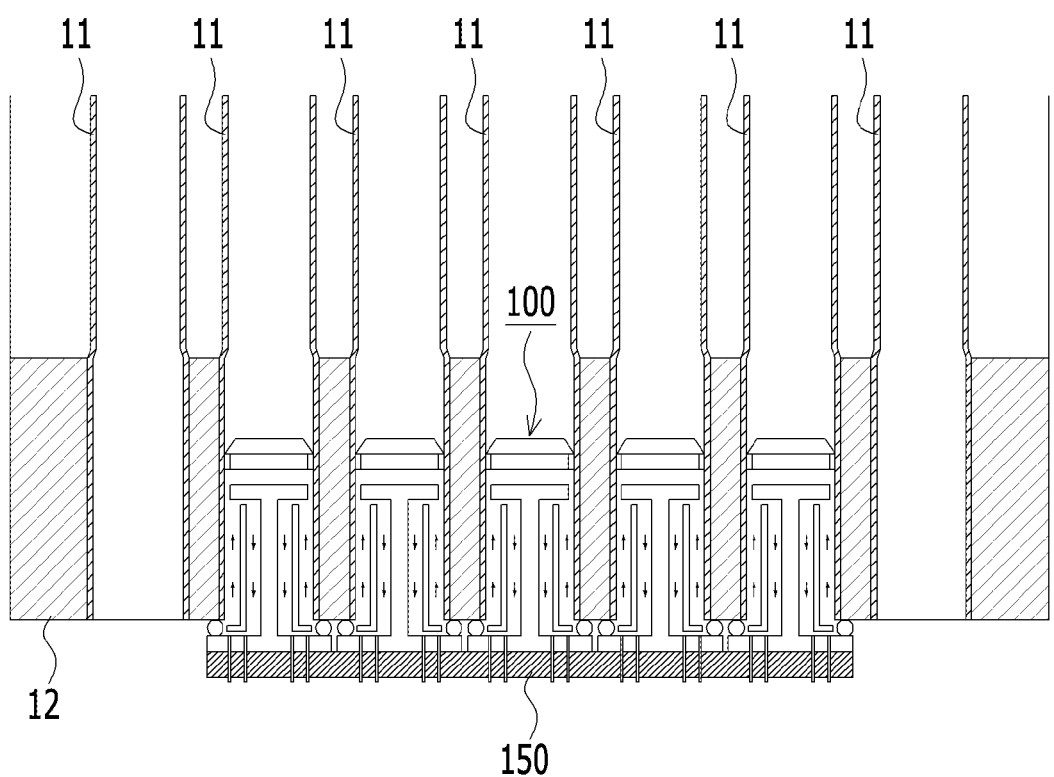
FIG. 7 is a side sectional view of illustrating the state in which a plurality of tubes is electroplated by an electroplating repair apparatus according to another embodiment of the system.

FIG. 7 is a side sectional view of illustrating the state in which a plurality of tubes is electroplated by electroplating repair apparatuses according to another embodiment of the system.

Referring to FIGS. 6 and 7, the electroplating repair apparatuses 100 of the present embodiment may further include a probe body holder 150 which arranges and fixes a plurality of probe bodies 100 corresponding to an arrangement of a plurality of tubes to be repaired. In the configuration shown in FIG. 6, one electroplating repair apparatus has one probe body holder 150.

In the embodiment shown in FIG. 7, according to the probe body holder 150 holding the probe bodies 110 corresponding to an arrangement a the tubes to be repaired, the plurality of tubes may be repaired at the same time, thereby substantially improving repairing efficiency.

Figure 8:
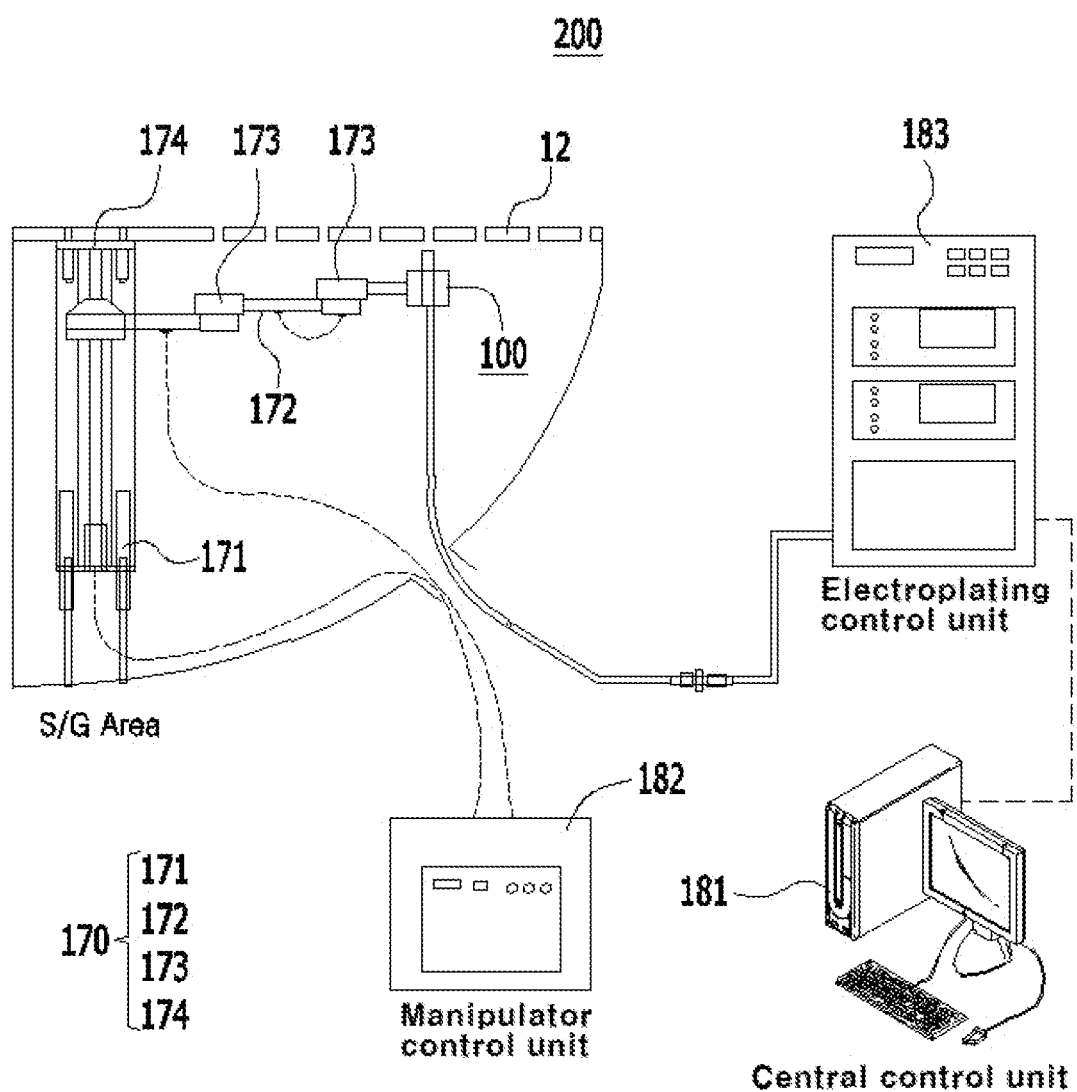
FIG. 8 is a view illustrating the configuration of an electroplating repair system according to an embodiment of the system.
Figure 9:
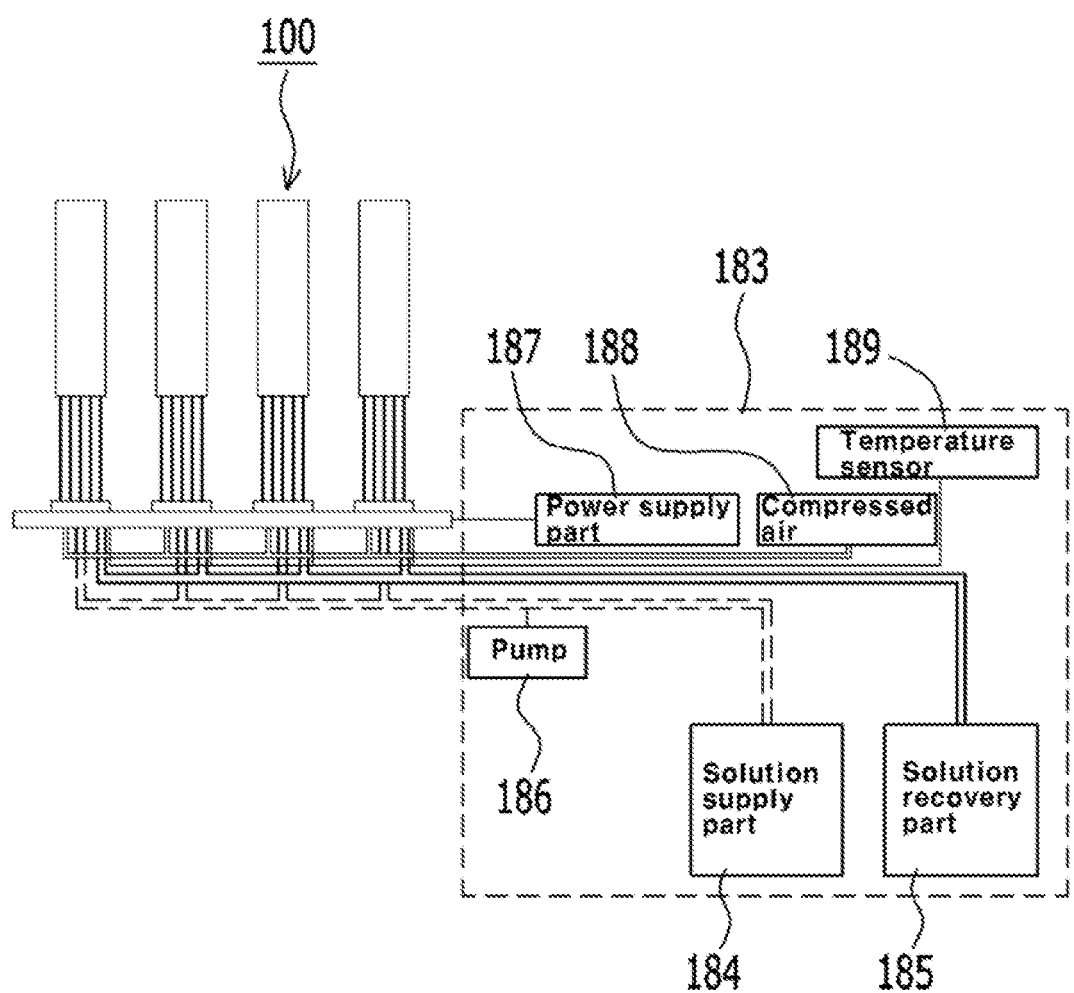
FIG. 9 is a detailed view illustrating an electroplating control unit of the electroplating repair system shown in FIG. 8.

FIG. 8 is a view illustrating the configuration of an electroplating repair system 200 according to an embodiment of the system, and FIG. 9 is a detailed view illustrating an electroplating control unit of the electroplating repair system shown in FIG. 8.

Referring to FIG. 8, the electroplating repair system 200 includes the above-mentioned electroplating repair apparatus 100, which may be provided with a manipulator 170 having a main body 171 in a specified structure, an extension arm 172, a tilting part 173, and a coupling fitting 174.

Specifically, as illustrated in FIG. 8, the extension arm 172 serves to extend a predefined length and change a position of the electroplating repair apparatus 100 while holding on one end thereof the electroplating repair apparatus 100. Further, in the present embodiment, the extension arm 172 is preferably attached to and surrounds an outer circumferential surface of the main body 171 such that it is rotatable along the outer circumferential surface of the main body 171. In this case, as illustrated in FIG. 8, one or more tilting parts 173 may be provided to change a tilting angle of the extension arm so as to change a position of the electroplating repair apparatus attached to one side of the extension arm 172.

The main body 171 may drive the extension arm 172, which is attached to one side thereof such that it is disposed adjacent to a target object, according to a control signal from a manipulator control unit 182. Here, the manipulator control unit 182 may control the operation of the manipulator 170.

More specifically, in the present embodiment, the main body 171 may preferably have a structure that is capable of being length-adjustable in the longitudinal direction corresponding to an extension direction of a tube 11 such that the main body is fixed adjacent to the tube 11 in the target object.

Here, as illustrated in FIG. 8, the manipulator 170 may have a structure corresponding to that of one side of the tube 11, and the coupling fitting 174 may be fixed attached to one side of the tube 11.

Further, the manipulator may have a structure in which the manipulator is length-adjustable in the longitudinal direction corresponding to an extension direction of a tube 11 so as to change a vertical position of the extension arm 172 attached to one side of the main body 171.

In the meantime, an electroplating control unit 183 may control the operation of the electroplating electrode 120 and the solution supply line 140 of the electroplating repair apparatus 100.

Further, a central control unit 181 may control the operation of the electroplating control unit 183 and the manipulator control unit 182.

In the meantime, as illustrated in FIG. 9, the electroplating control unit 183 may include a solution supply part 184, which supplies a solution to the electroplating repair apparatus using a pump 186, and a solution recovery part 185, which recovers the solution supplied to the electroplating repair apparatus.

Furthermore, the electroplating control unit 183 may include a compressed air supply part 188, which supplies compressed air to the electroplating repair apparatus, and a power supply 187, which supplies electric power to the electroplating repair apparatus, thereby ensuring a more stable operation of the electroplating repair system.

More preferably, as illustrated in FIG. 9, a temperature sensor 189 may be further provided to detect temperature of a solution supplied to the electroplating repair apparatus and transmit detected temperature data to the central control unit 181, thereby ensuring the more stable operation of the electroplating repair system.

Figure 10:
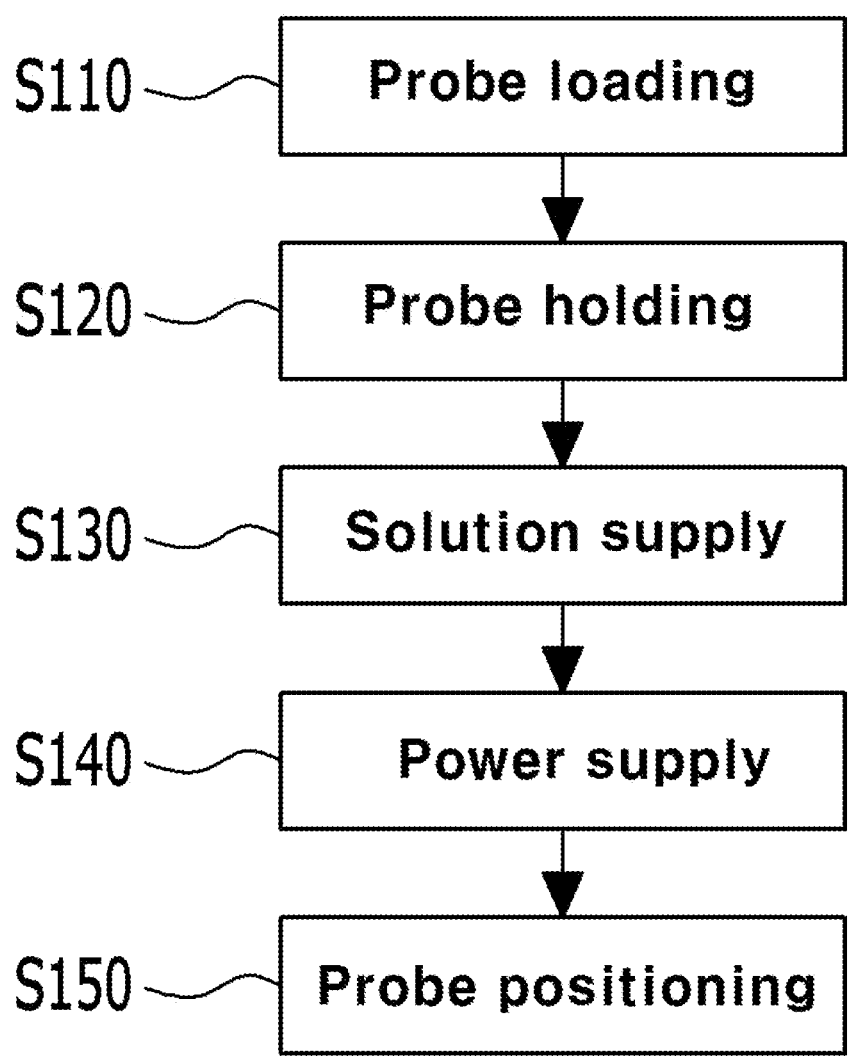
FIG. 10 is a flow chart illustrating an operating method of the electroplating repair system according to an embodiment of the system.

FIG. 10 is a flow chart illustrating an operating method of the electroplating repair system according to an embodiment of the system.

Referring to FIG. 10, along with FIGS. 4 to 9, the method S100 of operating the electroplating repair system may include loading a probe having a specified structure (S110), holding the probe (S120), supplying a solution (S130), and supplying power (S140).

Specifically, the loading step S110 is the step of loading the probe body 110 by a predefined distance into a target tube to be electroplated, as illustrated in FIG. 6.

The probe holding step S120 is the step of supplying compressed air to the sealing member 131 of the electroplating repair apparatus so as to hold the probe body 110 to the target tube to be electroplated, as illustrated in FIGS. 4 and 6.

The solution supply step S130 is the step of supplying an electroplating solution to the inside of the probe body 110 through the solution supply line 140 of the electroplating repair apparatus.

Finally, the power supply step S140 is the step of supplying power to the electroplating electrode 120 of the electroplating repair apparatus so as to perform an electroplating process on an expanded part and a sealing welding part.

If needed, probe positioning step S150 may be further performed so as to position the electroplating repair apparatus 100 using the manipulator 170 and the extension arm 172 holding the electroplating repair apparatus attached to one side of the extension arm 172, thereby ensuring more efficient electroplating on a plurality of target objects to be electroplated.

More preferably, the probe positioning step S150 may control the driving of the manipulator 170 and the extension arm 172 based on position data stored in the central control unit 181.

As set forth in the foregoing, according to the electroplating repair apparatus of the system, the provision of the probe body in a specified structure, the electroplating electrode, the sealing member, and the solution supply line in the electroplating repair apparatus enables the whole repair of the inside of the tube including the sealing welding part and the expanded part.

Further, according to the electroplating repair apparatus of the system, the provision of the probe body having the support in a specified structure, the extension, and the sealing member enables efficient sealing of the target objects including the expanded part and the sealing welding part to be electroplated, thereby ensuring a high quality electroplating repair effect.

Further, according to the electroplating repair apparatus of the system, the configuration in which the sealing member in a specified structure capable of expanding with compressed air supplied from the outside and surface-contacting and sealing the inner surface of the tube is attached to one side of the probe body enables efficient sealing of the target objects including the expanded part and the sealing welding part to be electroplated, thereby ensuring a high quality electroplating repair effect.

Furthermore, according to the electroplating repair apparatus of the system, the provision of the probe body holder in a specified structure capable of arranging and holding the plurality of probe bodies corresponding to an arrangement of the plurality of tube to be repaired enables simultaneous repairing of the plurality of tubes and thus substantially improves the repairing efficiency.

While the embodiments of the system have been described in the detailed description, the system is not limited thereto, but should be construed as including all of modifications, equivalents, and substitutions falling within the spirit and scope of the system defined by the appended claims.

That is, the system is not limited to the above-mentioned embodiments and the description thereof, and it will be appreciated by those skilled in the art that various modifications and equivalent embodiments are possible without departing from the scope and spirit of the system defined by the appended claims and that the system covers all the modifications and equivalents falling within the spirit and the scope of the system as defined by the appended claims.

The invention claimed is:

1. An electroplating repair system, for repairing an expanded part and a sealing welding part through electroplating, the system comprising:
   an electroplating repair apparatus having a probe body extending a predefined length in a structure corresponding to an inner diameter part of a tube, an electroplating electrode attached to and surrounding an outer circumferential surface of the probe body, the electroplating electrode having a flange at one bottom end thereof, a sealing member attached to opposite end sides of the probe body to seal a target portion to be electroplated, wherein one of the sealing members engages the flange to seal the target portion, and a solution supply line supplying a solution to the target portion through the inside of the probe body;

a manipulator having an extension arm extending a predefined length to change a position of the electroplating repair apparatus while holding the electroplating repair apparatus on one end side thereof, the extension arm coupled to and being driven by the manipulator wherein the extension arm has a structure surrounding an outer circumferential surface of the main body such that the extension arm is rotatable along the outer circumferential surface of the main body and wherein the extension arm has one or more tilting parts to change a tilting angle of the extension arm so as to change a position of the electroplating repair apparatus attached to one end side of the extension arm;

a manipulator control unit controlling an operation of the manipulator, wherein the extension arm is driven with a control signal from the manipulator control unit;

an electroplating control unit controlling operations of the electroplating electrode and the solution supply line of the electroplating repair apparatus; and a central control unit controlling operations of the electroplating control unit and the manipulator control unit.

2. The system according to claim 1, wherein the manipulator includes a main body held adjacent to the tube in the inside of a target object, wherein the main body has a structure that is length-adjustable by a predefined length in a longitudinal direction corresponding to an extension direction of the tube.

3. The system according to claim 2, wherein the main body has a structure corresponding to one end side of the tube and includes a coupling fitting fixedly attached to that end side of the tube.

4. The system according to claim 1, wherein the electroplating control unit includes:
   a solution supply part supplying a solution to the electroplating repair apparatus using a pump;
   a solution recovery part recovering the solution supplied to the electroplating repair apparatus;
   a compressed air supply part supplying compressed air to the electroplating repair apparatus; and
   a power supply part supplying electric power to the electroplating repair apparatus.

5. The system according to claim 4, wherein the electroplating control unit further includes a temperature sensor to detect temperature of the solution supplied to the electroplating repair apparatus and transmit detected temperature data to the central control unit.

6. The system according to claim 1, wherein the probe body of the electroplating repair apparatus includes:
   a cylindrical support; and
   an extension extending a predefined distance in an inner diameter direction of the tube from the support.

7. The system according to claim 6, wherein a sealing member is attached to an end of the extension to contact and seal the inner diameter part of the tube,
   wherein the sealing member has a structure that expands with compressed air supplied from the outside and surface-contacts and seals an inner circumferential surface of the tube.

* * * * *